United States Patent
Tanner et al.

(10) Patent No.: US 8,565,049 B1
(45) Date of Patent: Oct. 22, 2013

(54) METHOD AND SYSTEM FOR REDUCING THERMAL PROTRUSION OF AN NFT

(75) Inventors: Shawn M. Tanner, San Jose, CA (US); Yufeng Hu, Fremont, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 0 days.

(21) Appl. No.: 13/533,150

(22) Filed: Jun. 26, 2012

(51) Int. Cl.
*G11B 11/00* (2006.01)

(52) U.S. Cl.
USPC ............ 369/13.33; 369/13.03; 369/13.22; 369/13.14

(58) Field of Classification Search
None
See application file for complete search history.

(56) References Cited

U.S. PATENT DOCUMENTS

| | | |
|---|---|---|
| 5,872,684 A | 2/1999 | Hadfield et al. |
| 6,069,770 A | 5/2000 | Cui et al. |
| 6,428,715 B1 | 8/2002 | Abels et al. |
| 6,857,937 B2 | 2/2005 | Bajorek |
| 7,086,931 B2 | 8/2006 | Oyama et al. |
| 7,154,708 B2 | 12/2006 | Chhabra et al. |
| 7,455,332 B2 | 11/2008 | Jose et al. |
| 7,461,447 B2 | 12/2008 | Tzeng et al. |
| 7,770,285 B2 | 8/2010 | Bonhote et al. |
| 8,031,561 B2 * | 10/2011 | Hellwig et al. ............ 369/13.01 |
| 8,077,418 B1 | 12/2011 | Hu et al. |
| 8,107,326 B1 * | 1/2012 | Hirano et al. ............. 369/13.33 |

* cited by examiner

*Primary Examiner* — Muhammad N Edun (57) ABSTRACT

A method and system provide a near-field transducer (NFT) for an energy assisted magnetic recording (EAMR) transducer. The method and system include forming an NFT having a disk and a pin. A dielectric layer that substantially covers the NFT is deposited. A portion of the dielectric layer is removed such that the dielectric layer has an aperture therein. The aperture exposes the pin of the NFT. The EAMR transducer is annealed at a temperature greater than the expected operating temperature of the EAMR transducer.

14 Claims, 12 Drawing Sheets

Plan View
Prior Art
FIG. 1A

Side View
Prior Art
FIG. 1B

Plan View
Prior Art
FIG. 2A

Side View
Prior Art
FIG. 2B

METHOD AND SYSTEM FOR REDUCING THERMAL PROTRUSION OF AN NFT

BACKGROUND

Figure 1A:
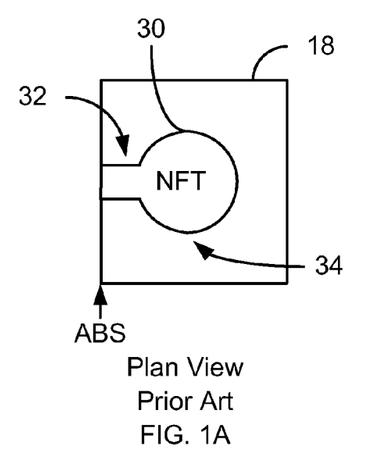
FIGS. 1A and 1B are diagrams depicting a conventional EAMR transducer.
Figure 1B:
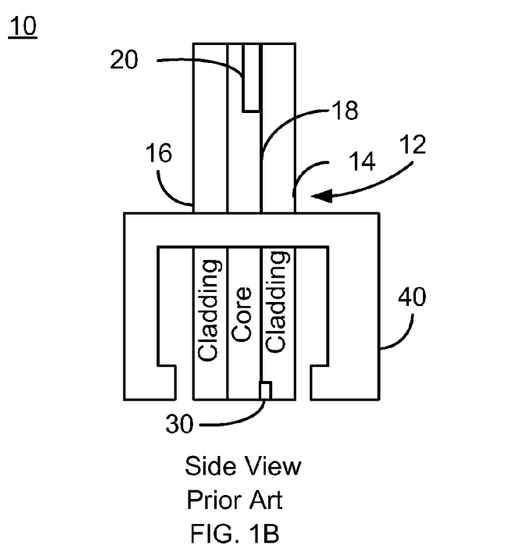

FIGS. 1A and 1B depict a portion of a conventional energy assisted magnetic recording (EAMR) transducer 10. The conventional EAMR transducer 10 includes a conventional waveguide 12 having a conventional core 18 and cladding 14 and 16, a grating 20, a conventional near-field transducer (NFT) 30, and a write pole 40. The NFT 30 has a disk portion 34 and a pin portion 32. The pin portion 32 is between the disk portion 34 and the air-bearing surface (ABS). The conventional EAMR transducer 10 is used in writing to a recording media and receives light, or energy, from a conventional laser (not shown).

In operation, light from a laser is coupled to the waveguide 12. Light is guided by the conventional waveguide 12 to the NFT 30 near the ABS. The NFT 30 utilizes local resonances in surface plasmons to focus the light to magnetic recording media (not shown), such as a disk. The surface plasmons used by the NFT 30 are electromagnetic waves that propagate along metal/dielectric interfaces. At resonance, the NFT 30 couples the optical energy of the surface plasmons efficiently into the recording medium layer with a confined optical spot which is much smaller than the optical diffraction limit. This optical spot can typically heat the recording medium layer above the Curie point in nano-seconds. High density bits can be written on a high coercivity medium with a pole 40 having relatively modest magnetic field.

Figure 2A:
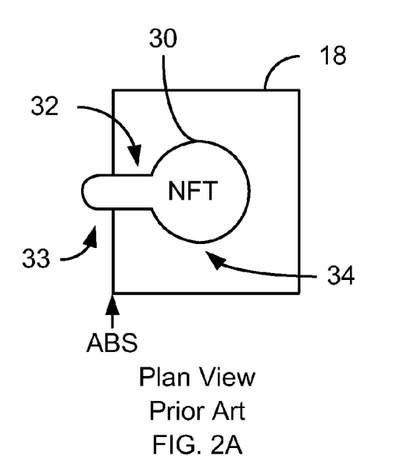
FIGS. 2A and 2B are diagrams depicting the conventional EAMR transducer during operation.
Figure 2B:
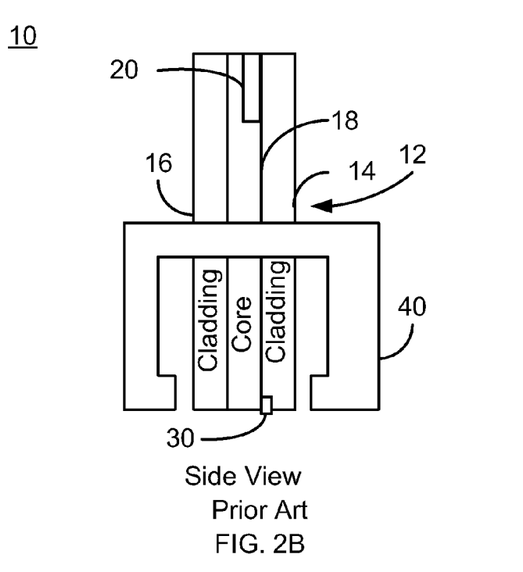

Although the EAMR transducer 10 may use the conventional NFT 30 in recording data to a media, there are drawbacks. FIGS. 2A and 2B depict the conventional EAMR transducer 10 during use and illustrate one such drawback. During operation, a significant amount of the light energy from the laser is lost in the form of local heating of the NFT 30. Some estimates indicate that the temperature of the EAMR transducer 10 in the vicinity of the NFT 30 may be approximately two hundred degrees centigrade. At such elevated operating temperatures, a portion of the NFT 30 may protrude from the ABS. This is shown in FIGS. 2A and 2B, particularly by portion 33 of the NFT 30. At the higher operating temperatures of the transducer 10, the pin 32 of the NFT may undergo elastic deformation and plastic deformation. These deformations may be due to the combination of high internal stress and softening of the NFT material (i.e. Au). As a result, the portion 33 of the pin 32 protrudes from the ABS. Although the elastic portion of the deformation may be at least partially corrected by reducing the temperature, the plastic portion of the deformation may not be. Further, the protrusion may be significant. In some cases, portion 33 of the NFT 30 may protrudes several nanometers from the ABS. Because of the low fly height of the conventional transducer 10, this protrusion 33 may result in the NFT 30 contacting the disk. As a result, a portion of the NFT 30 may be ground away, which adversely affects performance and reliability of the transducer 10.

Conventional mechanisms for addressing the protrusion 33 of the NFT 30 may include selecting the materials used for the NFT 30 to increase the hardness and/or increase the temperature at which the material softens. Such changes may reduce the efficiency of the NFT, which is undesirable. Further, it may be difficult to find a material that has the required mechanical stability and optical efficiency at elevated temperature.

Accordingly, what is needed is a system and method for improving reliability of an EAMR transducer.

BRIEF SUMMARY OF THE INVENTION

A method and system provide a near-field transducer for an energy assisted magnetic recording transducer. The method and system include forming an NFT having a disk and a pin. A dielectric layer that substantially covers the NFT is deposited. A portion of the dielectric layer is removed such that the dielectric layer has an aperture therein. The aperture exposes the pin of the NFT. The EAMR transducer is annealed at a temperature greater than the expected operating temperature of the EAMR transducer.

DETAILED DESCRIPTION OF THE EMBODIMENTS OF THE INVENTION

Figure 3:
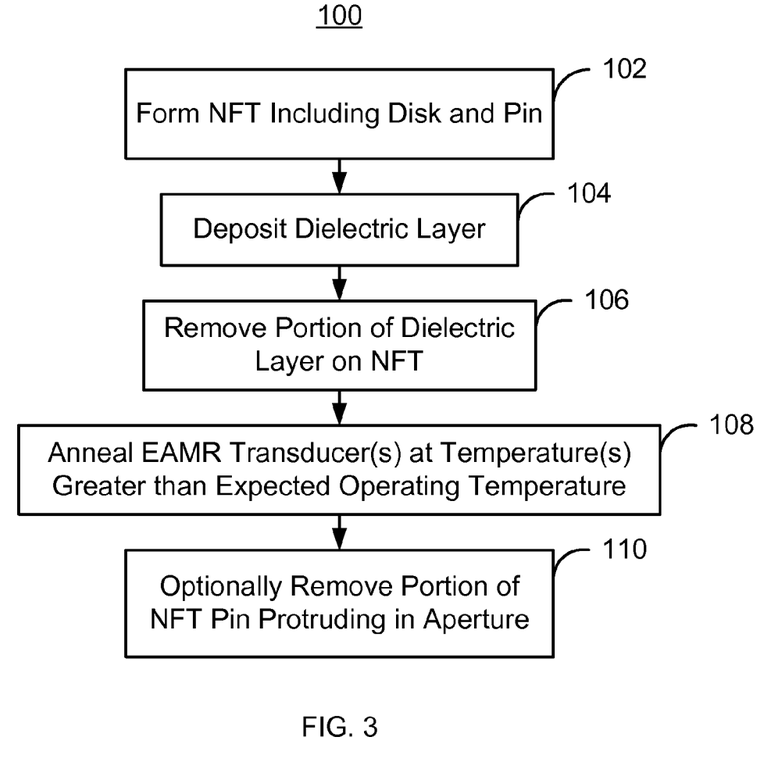
FIG. 3 is a flow chart depicting an exemplary embodiment of a method for reducing the protrusion of an NFT in an EAMR transducer.

FIG. 3 depicts one embodiment of a method 100 for reducing the protrusion of an NFT in an EAMR transducer. The method 100 may thus be part of a method for fabricating the EAMR transducer. For simplicity, some steps may be omitted, interleaved, performed in another order and/or combined. The EAMR transducer may be part of a merged head that also includes a read head and resides on a slider in a disk drive. The method 100 is also described in the context of providing a single EAMR transducer. However, the method 100 may be used to fabricate multiple transducers at substantially the same time. The method 100 is also described in the context of particular layers. However, in some embodiments, such layers may include multiple sub-layers. The method 100 also may commence after formation of other portions of the EAMR transducer. In one embodiment, the method 100 commences after formation of portions of the EAMR transducer. For example, the method 100 may start after parts of the waveguide, such as a core, are formed.

The NFT is formed, via step 102. The NFT may have a pin and a disk. The pin portion resides between the disk and the ABS location (the location at which the ABS is desired to reside when fabrication is complete). Although described as a disk, in some embodiments, the disk need not have a circular footprint. In some embodiments, step 102 includes multiple substeps. For example, film(s) such as an Au layer may be deposited for the NFT and portions of the films may be removed. Thus, the disk and pin may remain. In other embodiments, the disk and pin may be separately fabricated. In alternate embodiments, a trench may be formed in a dielectric layer and the NFT fabricated in the trench.

A dielectric layer is deposited, via step 104. Step 104 occurs after step 102. The dielectric layer may cover the NFT.

The step of depositing the dielectric may include depositing silicon dioxide, aluminum oxide, or some other dielectric. Further, in some embodiments, multiple dielectrics may be used. For example, the dielectric layer deposited in step 104 may include multiple sublayers. After step 104 is completed, the NFT is desired to be enclosed in a dielectric at least part of which is deposited in step 104.

A portion of the dielectric layer on the NFT is removed, via step 106. In some embodiments, step 106 is accomplished by performing an ion mill. In some such embodiments, the ion mill is an angled ion mill. In some embodiments, the angle of the ion mill is at least twenty and not more than fifty degrees from the surface of the wafer. In some such embodiments, the angle is at least thirty and not more than forty degrees from the surface of the wafer. The surface exposed in step 106 may be at a nonzero angle with respect to the ABS. Through step 106, an aperture is formed in the dielectric layer. The aperture exposes the pin of the NFT.

The EAMR transducer is annealed at a temperature greater than an expected operating temperature of the EAMR transducer, via step 108. In some embodiments, the temperature of the anneal is greater than 150° C. In some such embodiments, the temperature of the anneal is not more than 200° C. In some embodiments, the anneal is carried out for at least one hour. In some such embodiments, the anneal is for not more than sixteen hours. The anneal may be performed on a wafer level. Thus, all of the transducers on the substrate may be annealed substantially simultaneously. Because the aperture was formed in the dielectric, the NFT pin may flow into the aperture as a result of the anneal.

Figure 4:
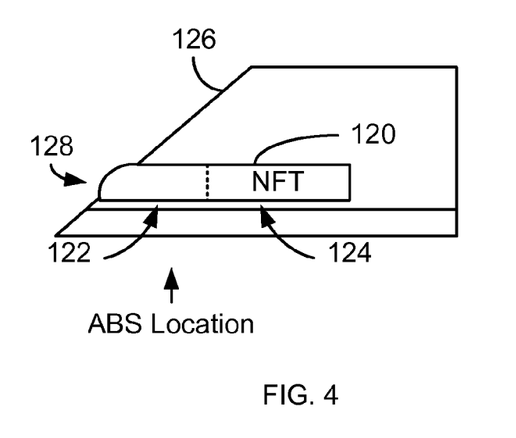
FIG. 4 is a diagram depicting a side view of an exemplary embodiment of an NFT formed using an exemplary embodiment of the method.

FIG. 4 depicts a side view of one embodiment of a transducer including an NFT 120 after step 108 is performed. FIG. 4 is not to scale. The NFT 120 includes a pin 122 and a disk 124 and is formed in step 102. Also shown is the dielectric 126 deposited in step 104. Aperture 128 has been formed in the dielectric 126. In the embodiment shown in FIG. 4, an angled ion mill has been used to expose the pin 122. Thus, the surface of the dielectric 126 forms a nonzero angle with the ABS location. The ABS location indicates the location of the ABS upon completion of fabrication. Because of the anneal performed in step 108 and the outlet provided by the aperture 128, a portion of the pin 122 of the NFT 120 deforms and flows into the aperture 128. Thus, the NFT pin 122 may be considered to protrude in a manner analogous to the protrusion that could occur during operation.

A portion of the pin 122 protruding in the aperture 128 may optionally be removed, via step 110. In some embodiments, the removal occurs shortly after the anneal. In such embodiments, the protrusion of the NFT pin 128 may be removed through another ion mill. In other embodiments, the removal may occur significantly later in processing. For example, the portion of the pin 122 that protrudes through the aperture 128 may be removed through lapping during backend processing. For example, the substrate is divided into row bars, each or which includes multiple EAMR transducers. The row bar is then lapped and the protrusion removed. In embodiments in which the protrusion is removed earlier, the EAMR transducer typically still undergoes lapping. However, the protrusion has already been removed. In some such embodiments, the row bar may be lapped to expose the pin 122 and then annealed again. In such embodiments, the pin 122 may protrude from the lapped surface that has been exposed during lapping. The protruding portion of the pin 122 may then be removed through additional lapping or another process. Fabrication of the transducer may then be completed.

Figure 5:
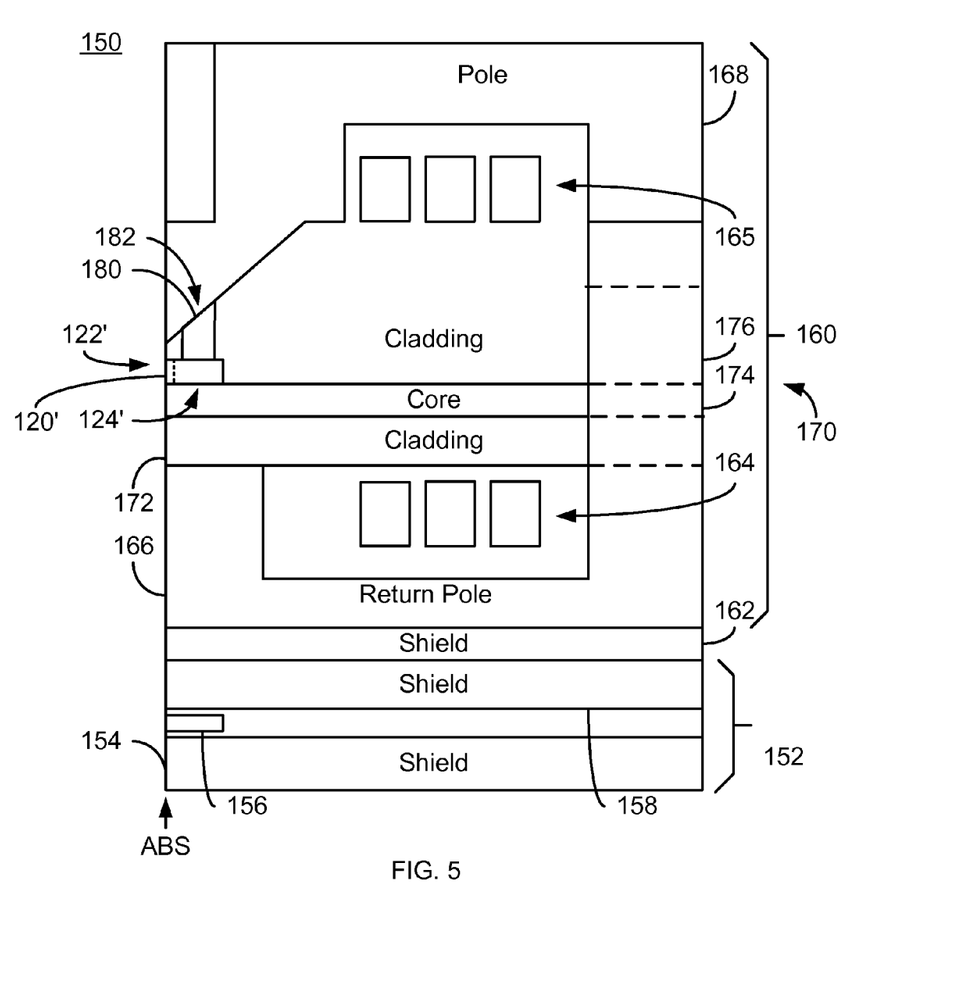
FIG. 5 is a diagram depicting an exemplary embodiment of an EAMR head employing an NFT.

Using the method 100 an NFT that has reduced thermal protrusion may be fabricated. For example, FIG. 5 depicts a side view of a head 150 including an NFT 120' fabricated using the method 100. FIG. 5 is not to scale. Further, not all components may be depicted. In addition, other components and/or components having a different configuration may be used. The head 150 includes an EAMR transducer 160 and a read transducer 152. The read transducer 152 includes shields 154 and 158 as well as read sensor 156. The EAMR transducer 160 includes optional shield 162, coils 164 and 165 (which may form a helical coil or be pancake coils), return pole 166, waveguide 170 that includes cladding 172 and 176 as well as core 174, and pole 168. The EAMR transducer 150 also includes an NFT 120' and optional heat sink 180. The NFT 120' is analogous to the NFT 120. The NFT 120' thus includes a disk portion 124' and a pin portion 122' analogous to the disk portion 124 and pin portion 122, respectively. The pin portion 122' is between the disk portion 124' and the ABS. Thus, the disk portion 124' is recessed from the ABS The disk portion 124' extends further in the track width direction (perpendicular to the plane of the page in FIG. 5) than the pin portion 122'.

The NFT 120/120' has been fabricated using the method 100. Because of the anneal performed at the at temperatures that may be above the operating temperature, stress relief and deformation of the NFT 120/120' have been achieved. For example, the plastic deformation of the NFT 120/120' may have been accounted for by the anneal and removal of the protrusion of the NFT 120/120'. Thus, the NFT 120/120' may be subject to less thermal protrusion. For example, in some embodiments, the NFT 120/120' may protrude not more than one nanometer during operation. In some such embodiments, the NFT 120/120' may protrude not more than one-half nanometer during operation. Further, the protrusion that the NFT 120/120' undergoes may be elastic, rather than plastic. Because the NFT 120/120' is subject to less protrusion, the NFT 120/120' is less likely to contact the disk (not shown). As a result, performance and reliability of the NFT 120/120' and the head 150 may be improved. Further, because the anneal in step 108 may be carried out at a wafer level, throughput may be improved.

Figure 6:
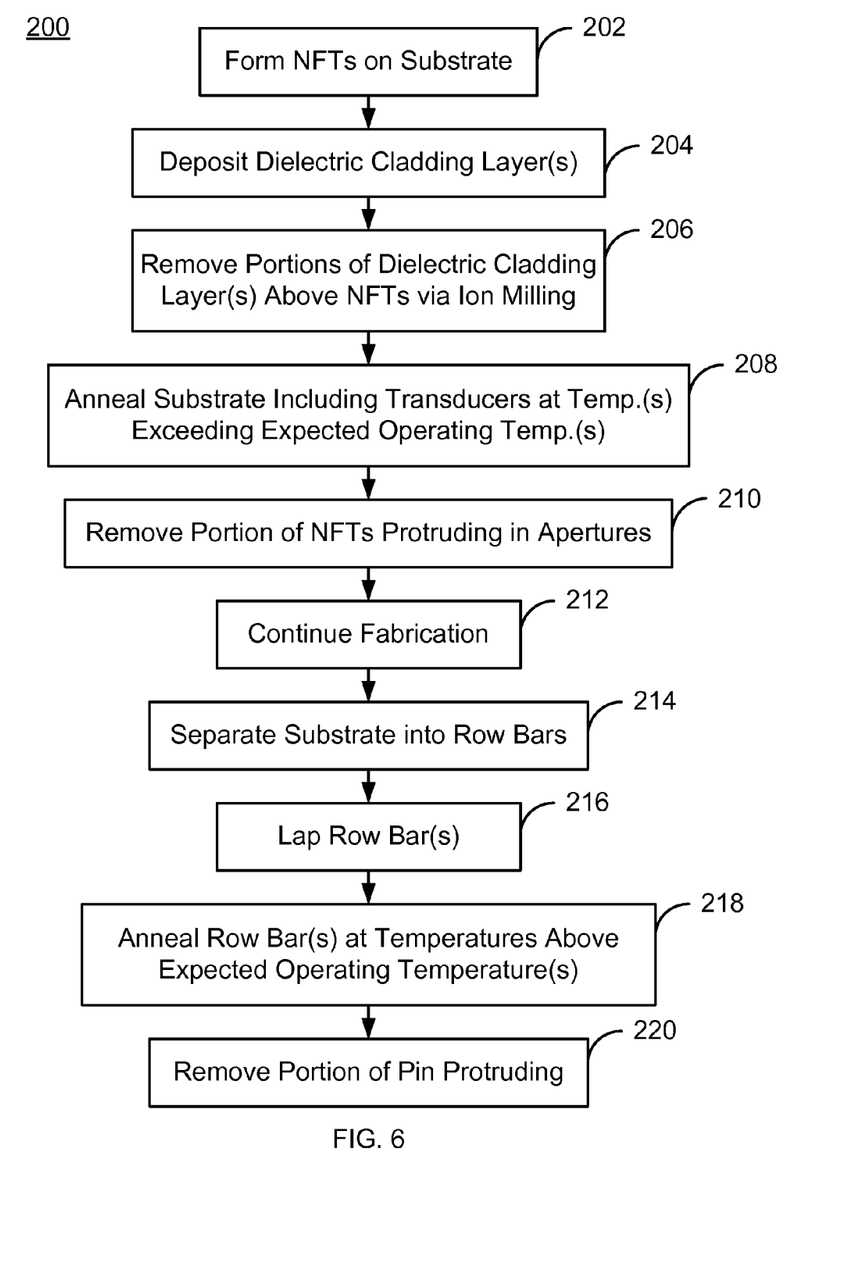
FIG. 6 is a flow chart depicting another exemplary embodiment of a method for reducing the protrusion of an NFT in an EAMR transducer.

FIG. 6 is a flow chart depicting an exemplary embodiment of a method 200 for reducing protrusion of an NFT in an EAMR head. For simplicity, some steps may be omitted, interleaved, performed in another order and/or combined. FIGS. 7-14 are diagrams depicting side and top views of an exemplary embodiment of a portion of an EAMR transducer during 250 fabrication. For clarity, FIGS. 7-14 are not to scale. Further, although FIGS. 7-13 depict the ABS location (location at which the ABS is to be formed) and ABS at a particular point in the pole, other embodiments may have other locations for the ABS. Referring to FIGS. 6-14, the method 200 is described in the context of the EAMR transducer 250. However, the method 200 may be used to form another device (not shown). The EAMR transducer 250 being fabricated may be part of a merged head that also includes a read head (not shown in FIGS. 7-14), a laser (not shown in FIGS. 7-14) and resides on a slider (not shown) in a disk drive. In addition, other portions of the EAMR transducer 250, such as the pole(s), shield(s), coil(s), and remaining optics are not shown. The method 200 also may commence after formation of other portions of the EAMR transducer 250. The method 200 is also described in the context of providing a single EAMR transducer 250 and a single NFT in the EAMR transducer 250. However, the method 200 may be used to fabricate multiple transducers and/or multiple heat sinks per transducer at substantially the same time. The method 200 and device 250 are also described in the context of particular layers. However, in some embodiments, such layers may include multiple sublayers.

Figure 7:
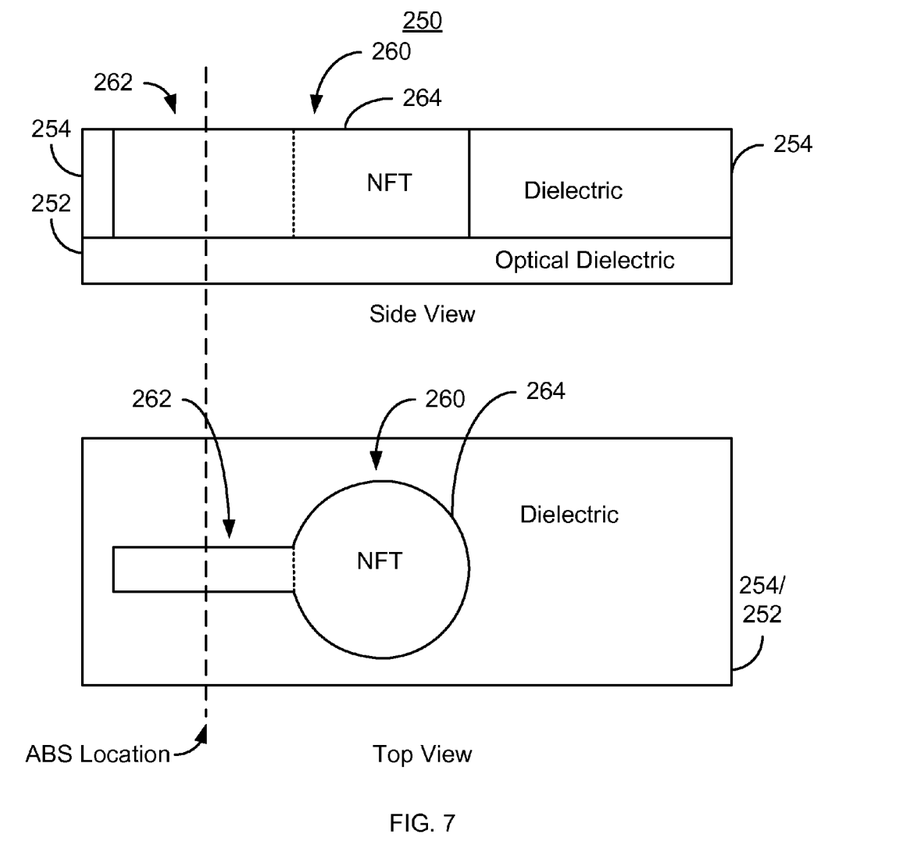
FIGS. 7-14 are diagrams depicting an exemplary embodiment of a magnetic recording transducer during fabrication.

An NFT is formed on a substrate, via step 202. Step is analogous to step 102 of the method 100. FIG. 7 depicts the transducer 250 after step 202 is performed. Thus, an NFT 260 is shown as being formed on optical dielectric 252. The NFT 260 includes a disk 264 and pin 262. Thus, in the embodiment depicted, the disk 264 of the NFT 260 has a circular footprint. Also shown is dielectric 254. However, in other embodiments, the dielectric 254 is omitted.

Figure 8:
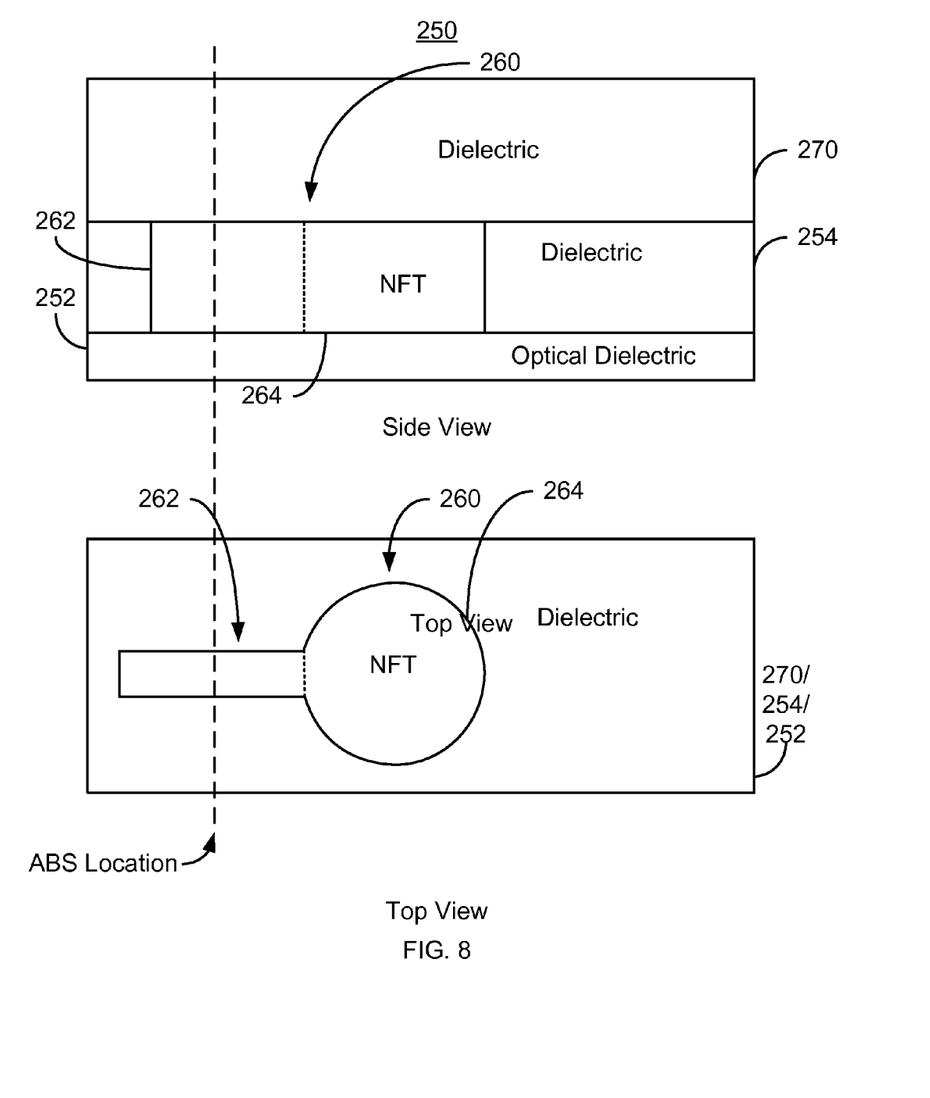

A dielectric cladding layer is deposited, via step 204. Step 204 is analogous to step 104. FIG. 8 depicts the transducer 250 after step 204 is performed. Thus, a dielectric layer 270 covers the NFT 260. In some embodiments, the dielectric 254 is deposited in the same step 204. In other embodiments, the dielectric 254 may have been previously provided. In some embodiments, the dielectric 254 and 270 are substantially the same and may be considered as a single layer.

Figure 9:
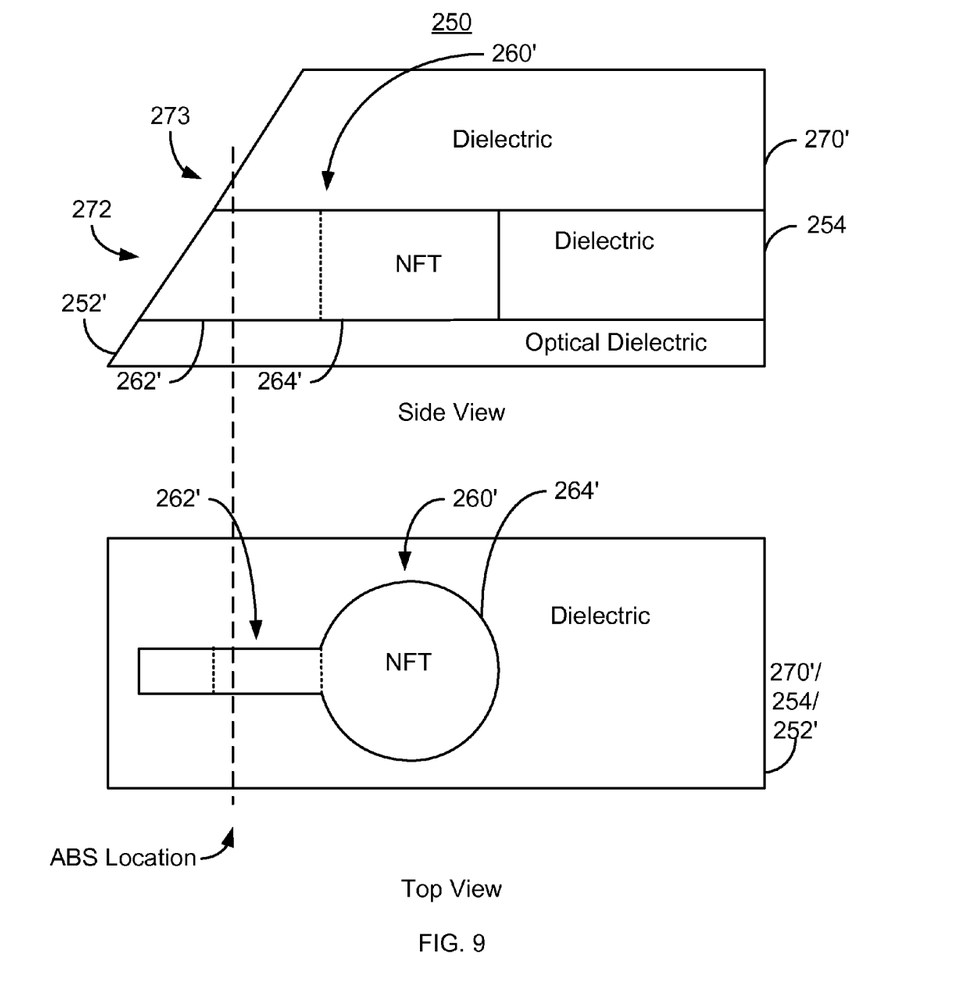

An angled ion mill is performed to remove portion of the dielectric layer 270, via step 206. In some embodiments, the angle of the ion mill may be at least twenty and not more than fifty degrees form the surface of the wafer. In other embodiments, the angle may be at least thirty and not more than forty degrees from the surface of the wafer. FIG. 9 depicts the transducer 250 after step 206 is performed. Thus, an aperture 272 has been formed in the dielectric 270' and ion milled surface 273 exposed. In the embodiment shown, a portion of the NFT 260' and the dielectric 252' have also been removed. As can be seen in FIG. 9, the surface 273 is at a nonzero angle from the ABS location. The aperture 272 exposes the pin 262' of the NFT 260'.

Figure 10:
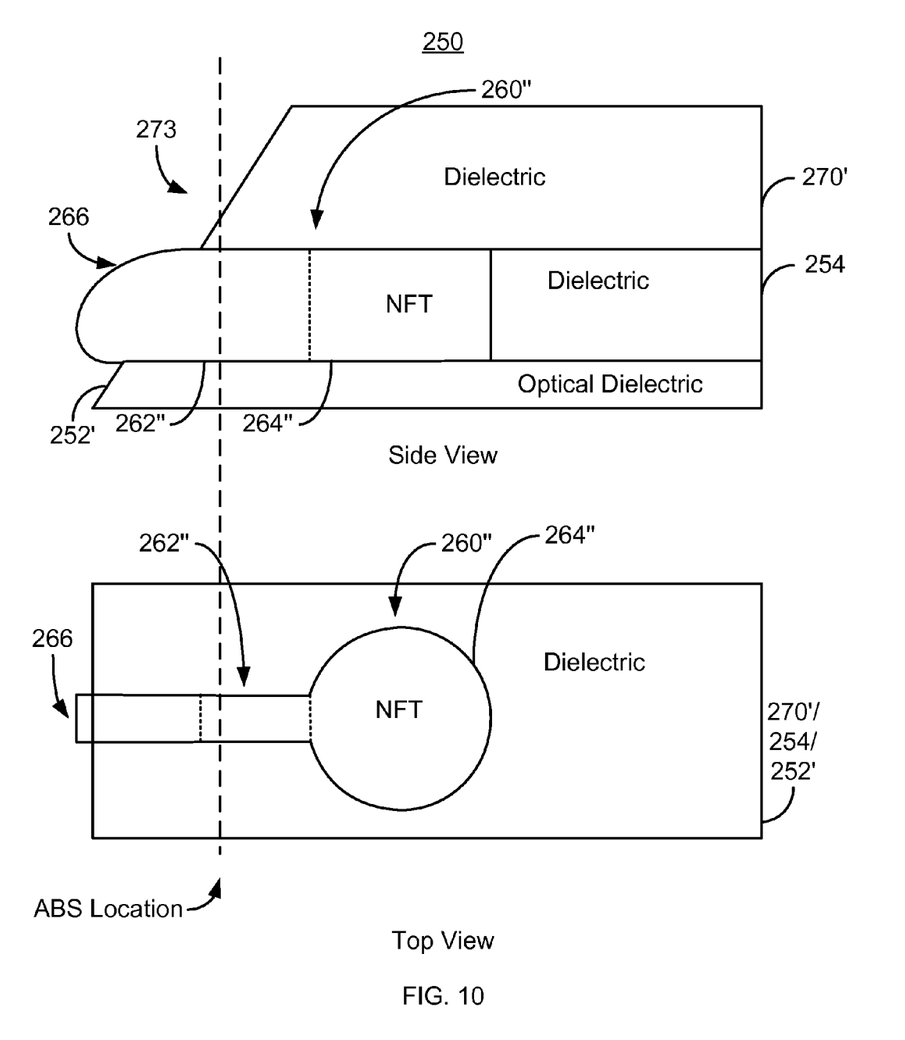

The EAMR transducer is annealed at a temperature greater than an expected operating temperature of the EAMR transducer, via step 208. In some embodiments, the temperature of the anneal is greater than 150° C. In some such embodiments, the temperature of the anneal is not more than 200° C. In some embodiments, the anneal is carried out for at least one hour. In some such embodiments, the anneal is for not more than sixteen hours. The anneal may be performed on a wafer level. Thus, all of the transducers on the substrate may be annealed substantially simultaneously. Because the aperture 272 was formed in the dielectric 270', the NFT pin 262" may flow into the aperture as a result of the anneal. FIG. 10 depicts the EAMR transducer 250 after step 208 has been performed. For clarity, the aperture 272 is not separately labeled. Because the aperture 272 was formed in the dielectric 270', the NFT pin 262" has protruded into the aperture 272 as a result of the anneal. Thus protrusion 266 of the pine 262" lies outside of the dielectric 270'.

Figure 11:
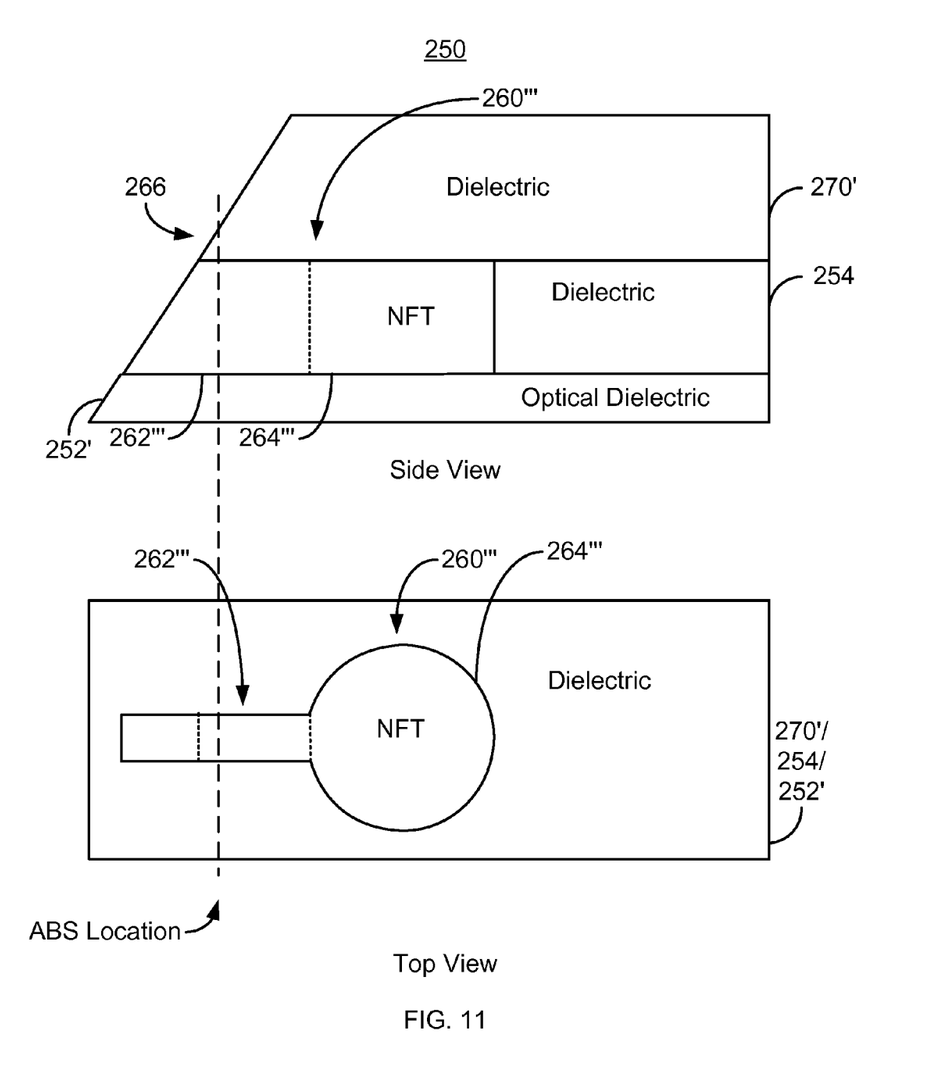

The protrusion 266 of the pin 262" may optionally be removed, via step 210. In some embodiments, the removal occurs shortly after the anneal. In such embodiments, the protrusion of the NFT pin 128 may be removed through another ion mill or other process. FIG. 11 depicts the transducer 250 after step 210 has been performed. The protrusion 266 has been removed, leaving NFT 260''' including pin 252''' and disk 264'''. Fabrication may then continue, via step 212.

Figure 12:
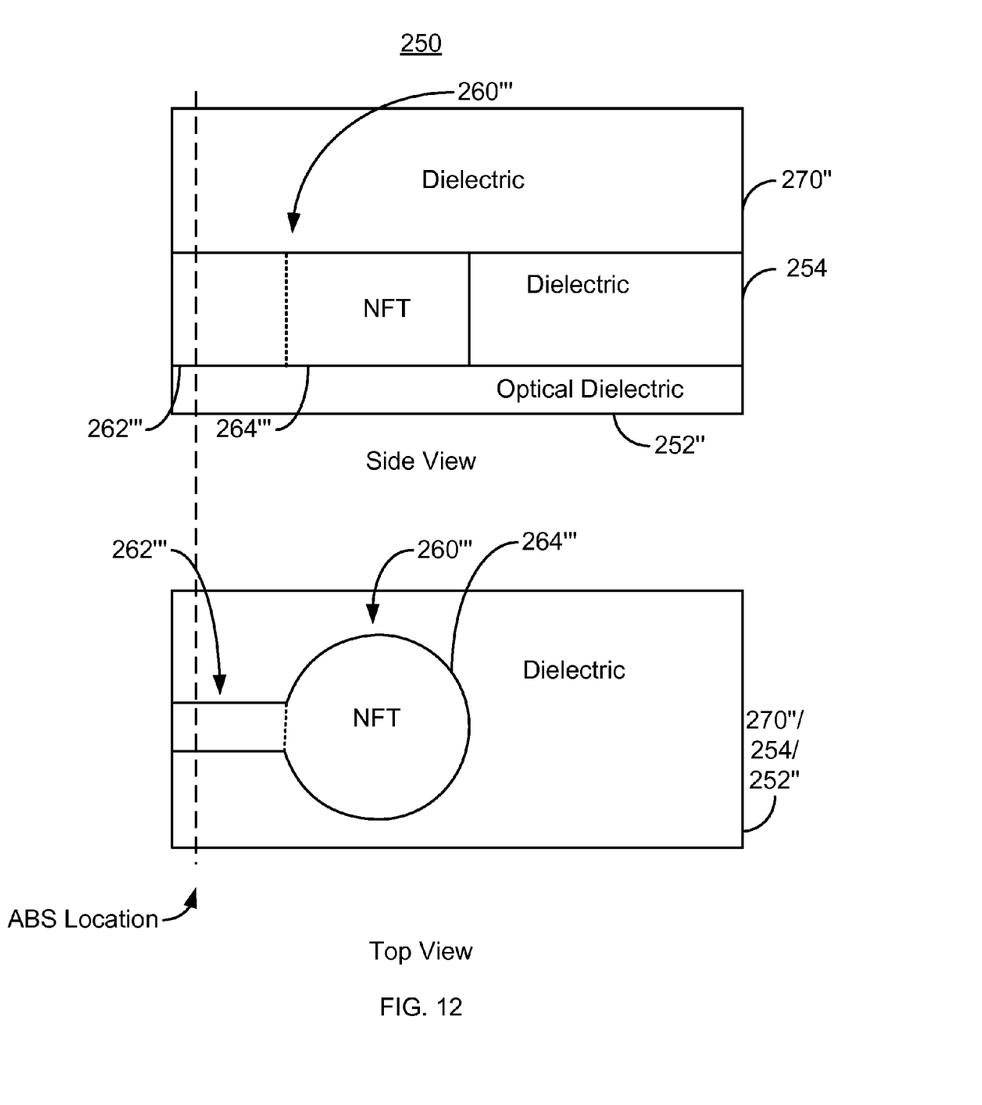

The substrate on which the EAMR transducers 250 reside is divided into row bars, via step 214. In some embodiments, each row bar includes two transducers 250. The row bar is then lapped, via step 216. In some embodiments, the lapping in step 216 is terminated before the ABS has been exposed. FIG. 12 depicts the EAMR transducer after step 216 has been performed. Thus, the edge of the substrate is closer to the ABS location. In addition, the NFT 260''' has a shorter pin 262'''. However, the disk 264'''remains intact. Further, the pin 262''' of the NFT 260''' is exposed.

Figure 13:
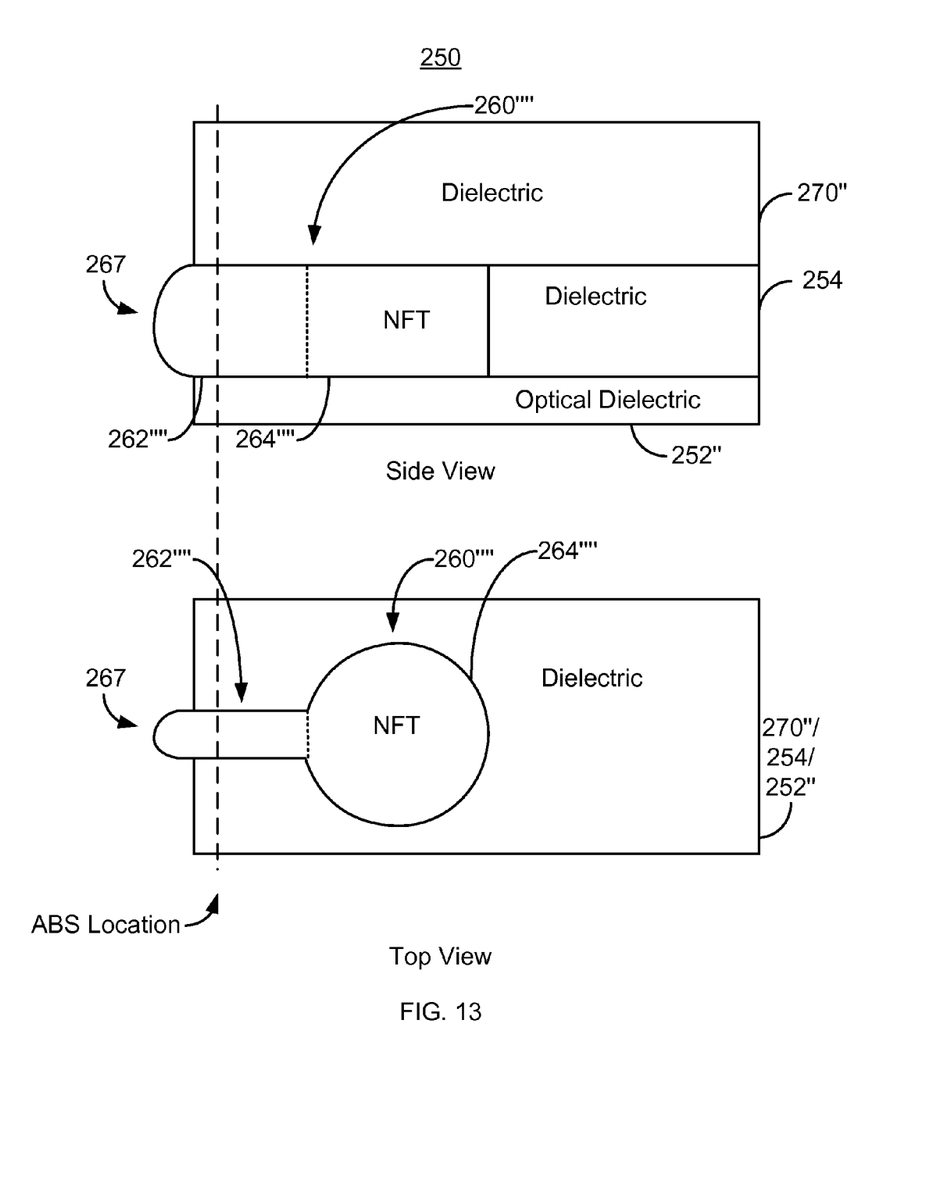

The EAMR transducer 250 is then annealed again, via step 218. The annealing in step 218 is analogous to the anneal in step 208 in that the anneal is desired to be carried out at temperatures above the expected operating temperature(s). Thus, the temperature(s) used for the anneal in step 218 may be the same as for the step 208. Similarly, the anneal times may be analogous in steps 208 and 218. However, in other embodiments, different times and/or temperatures may be used in step 218 than in step 208. FIG. 13 depicts the transducer 250 after step 218 is performed. Thus, another protrusion 267 has been formed.

Figure 14:
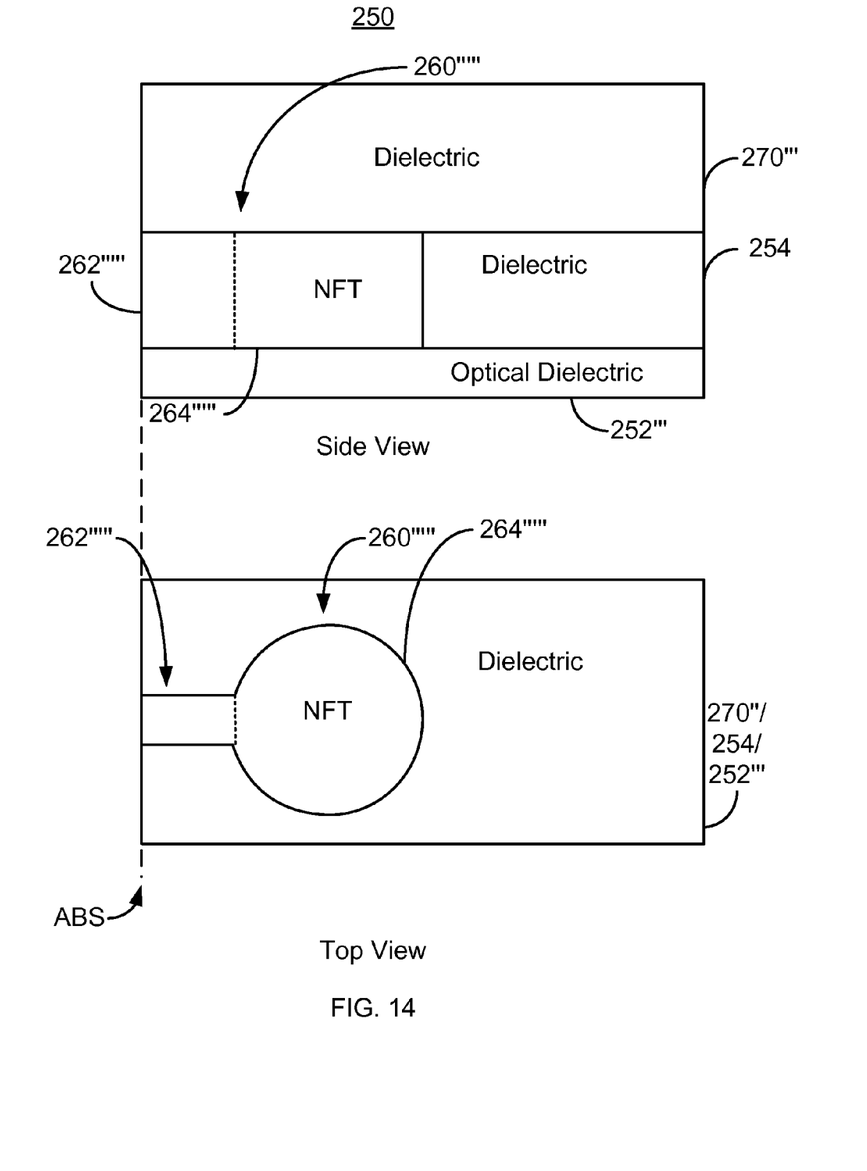

The protrusion 267 is removed, via step 220. In some embodiments, step 220 is performed by re-lapping the row bar and thus the EAMR transducer 250. Fabrication of the transducer may then be completed. FIG. 14 depicts the transducer 250 after step 220 is performed. Thus, protrusion 267 has been removed. In addition, the ABS has been exposed.

Using the method 200, the EAMR transducer 250 may be fabricated. Thus, an NFT 260 that has reduced thermal protrusion may be provided. Consequently, manufacturing, reliability, and performance of the EAMR transducer 250 may be improved.

We claim:

1. A method for providing a near-field transducer (NFT) for an energy assisted magnetic recording (EAMR) transducer the method comprising:
   forming an NFT having a disk and a pin;
   depositing a dielectric layer substantially covering the NFT;
   removing a portion of the dielectric layer such that dielectric layer has an aperture therein, the aperture exposing the pin; and
   annealing the EAMR transducer at a temperature greater than an expected operating temperature of the EAMR transducer.

2. The method of claim 1 wherein the temperature is greater than 150° C.

3. The method of claim 2 wherein the temperature is not more than 200° C.

4. The method of claim 1 wherein the step of annealing the EAMR transducer further includes:
   annealing the EAMR transducer at the temperature for at least one hour and not more than sixteen hours.

5. The method of claim 1 wherein EAMR transducer is one of a plurality of EAMR transducers on a substrate and wherein the step of annealing the EAMR transducer further includes
   annealing the substrate at the temperature such that the plurality of transducers is annealed.

6. The method of claim 5 further comprising:
   dividing the substrate into a plurality of row bars, the EAMR transducer residing on a row bar of the plurality of row bars;
   lapping the row bar;
   annealing the row bar such that a portion of the pin protrudes from a lapped surface; and
   removing the portion of the pin of the NFT after the step of annealing the row bar.

7. The method of claim 6 wherein the step of removing the portion of the pin further includes:
   performing an additional lapping of the row bar.

8. The method of claim 1 a portion of the pin protrudes at least into the aperture after the annealing step.

9. The method of claim 8 further comprising:
    removing the portion of the pin.

10. The method of claim 8 wherein the step of removing the pin further includes:
    lapping the EAMR transducer.

11. The method of claim 1 wherein the step of removing the portion of the dielectric layer further includes:
    ion milling at least the portion of the dielectric layer.

12. The method of claim 1 wherein the EAMR transducer resides on a row bar including at least one additional EAMR transducer, the method further comprising:
    annealing the row bar such that a portion of the pin protrudes; and
    lapping the row bar such that the portion of pin is removed.

13. An EAMR transducer having an air-bearing surface (ABS) configured to reside in proximity to a media during operation, the EAMR transducer comprising:
    a near field transducer (NFT) for focusing the energy onto the region of the media, the NFT having a disk and a pin proximate to the ABS, the pin protruding not more than one nanometer during operation of the EAMR transducer;
    a write pole configured to write to a region of the media; and
    at least one coil for energizing the write pole.

14. The EAMR transducer of claim 13 wherein the pin protrudes not more than one-half nanometer during operation of the EAMR transducer.

* * * * *